(12) United States Patent
Le Pabic

(10) Patent No.: US 7,390,238 B2
(45) Date of Patent: Jun. 24, 2008

(54) BEEHIVE BASE DEVICE

(76) Inventor: Jean Pierre Le Pabic, 20, avenue des Accacias, 92 500 Rueil Malmaison (FR)

( * ) Notice: Subject to any disclaimer, the term of this patent is extended or adjusted under 35 U.S.C. 154(b) by 270 days.

(21) Appl. No.: 10/479,919

(22) PCT Filed: May 2, 2002

(86) PCT No.: PCT/FR02/01511

§ 371 (c)(1),
(2), (4) Date: Aug. 23, 2004

(87) PCT Pub. No.: WO02/091816

PCT Pub. Date: Nov. 21, 2002

(65) Prior Publication Data

US 2005/0064788 A1    Mar. 24, 2005

(30) Foreign Application Priority Data

May 14, 2001    (FR)    ................... 01 06290

(51) Int. Cl.
*A01K 47/06*    (2006.01)
(52) U.S. Cl. ............................................. 449/2; 449/26
(58) Field of Classification Search .................... 449/2, 449/3, 26, 32; 52/342
See application file for complete search history.

(56) References Cited

U.S. PATENT DOCUMENTS

| | | | | |
|---|---|---|---|---|
| 187,911 A * | 2/1877 | Russell | ........................ | 449/32 |
| 1,258,916 A * | 3/1918 | Kruse | ........................ | 220/3.4 |
| 1,535,920 A * | 4/1925 | Jonian | ........................ | 449/3 |
| 2,566,829 A | 9/1951 | France | | |
| 5,162,014 A * | 11/1992 | Moore et al. | ................... | 449/2 |
| 6,468,129 B1 * | 10/2002 | Griffith | ........................ | 449/3 |
| 6,500,046 B2 * | 12/2002 | Jang | .............................. | 449/3 |
| 6,579,147 B1 * | 6/2003 | DeYoung | .................... | 449/15 |
| 6,837,770 B2 * | 1/2005 | Ruzicka | ........................ | 449/2 |

FOREIGN PATENT DOCUMENTS

| FR | 2705528 | | 12/1994 |
|---|---|---|---|
| GB | 2265811 A | * | 10/1993 |

* cited by examiner

*Primary Examiner*—Rob Swiatek
(74) *Attorney, Agent, or Firm*—Boyle Fredrickson, S.C.

(57) ABSTRACT

A device positioned beneath a beehive for use in controlling parasites in beehives including a base structure and a number of bars extending across the base structure. The bars are held spaced from one another by crosspieces engaged with the bars and the base structure. The bars are spaced from one another to enable waste and parasites to fall between the bars. The bars are formed of a low-adhesion material to prevent the parasites from being able to climb onto the bars and back into the beehive.

22 Claims, 2 Drawing Sheets

BEEHIVE BASE DEVICE

Figure 1:
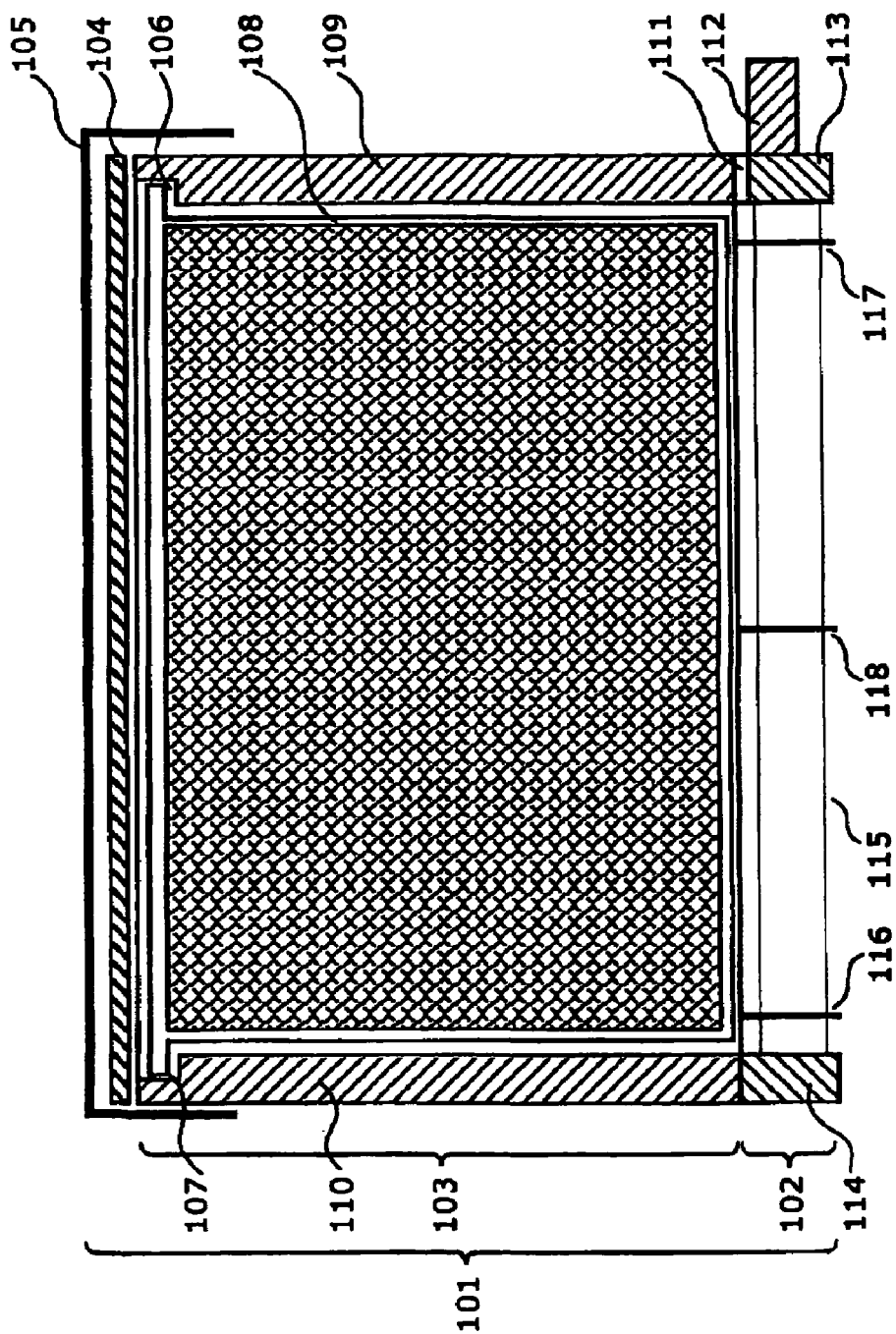

The object of the present invention is a beehive base device. The field of the invention is that of apiculture, and more particularly that of bee parasite control. One such parasite is, for example, Varroa Jacobsoni. One of the goals of the invention is to be able to reutilize in part existing materials while increasing the effectiveness of parasite control. Another goal of the invention is to reduce the cost of a beehive base that controls parasites.

Varroa Jacobsoni is known in particular in the field of apiculture. This parasite is a mite living on bees and feeding on their hemolymph. To reproduce, the parasite penetrates into the cells of the brood just before operculation and reproduces by living as a parasite on the nymph. It is also known that Varroa Jacobsoni is a very mobile parasite and that in the course of its movements, it falls to the base of the beehive from where it must subsequently crawl back up.

In the prior art is known French Patent 93 06484 which describes a device that prevents Varroa Jacobsoni from crawling up. This prior art device is constituted of a tray comprising bars placed under the frames. These bars are spaced so as to allow evacuation of the Varroa Jacobsoni during their fall. These bars are fixed in the framing, following shaping in this framing of apertures designed to receive the ends of each of the bars. For the prior art device to fulfill its function, the shaping must be precise, so that the Varroa Jacobsoni can be evacuated, but so that the bees cannot escape. This shaping thus has a cost which limits the widespread use of the device.

Another inconvenience of the prior art device is that the method of fixing the bars, for each of their ends, requires the use of rigid and perfectly rectilinear bars. Such bars are, in the prior art, PVC or methacrylate tubes whose walls are sufficiently thick for accommodating the above constraints. This naturally leads to a higher cost.

Another inconvenience of the prior art device is that its practical construction necessitates the use of specialized tools. Its construction also necessitates the individual shaping of the edges of the device. In other words, this means that each edge of the framing is shaped while it is not integral with the other edges. This requires the existing framings to be disassembled. This also requires the implementation of techniques allowing a precise assembly or reassembly of the framing.

The invention solves these problems by utilizing an inexpensive material for constructing the bars. These bars are then aligned owing to the crosspieces. Some of these crosspieces are themselves fixed to the framing. A device according to the invention may then simply be adapted onto an existing beehive base by using a plain saw. Thus the costs of constructing and implementing a device according to the invention are much lower in comparison with the prior art costs.

The invention thus has the object of a beehive base device comprising a framing wherein the section corresponds to the horizontal section of the beehive, the interior of the framing is hollow and comprises, under a beehive honeycomb and parallel to this honeycomb, a bar, the lateral proximity of the bar being pierced, characterized in that the bar is fixed to the framing by at least one crosspiece.

The invention will be better understood upon examining the following description and the accompanying figures. These are presented by way of indication and do not in any way limit the invention. The figures show:

FIG. 1: A lateral cross sectional view of the beehive assembly comprising a beehive base according to the invention.

Figure 2:
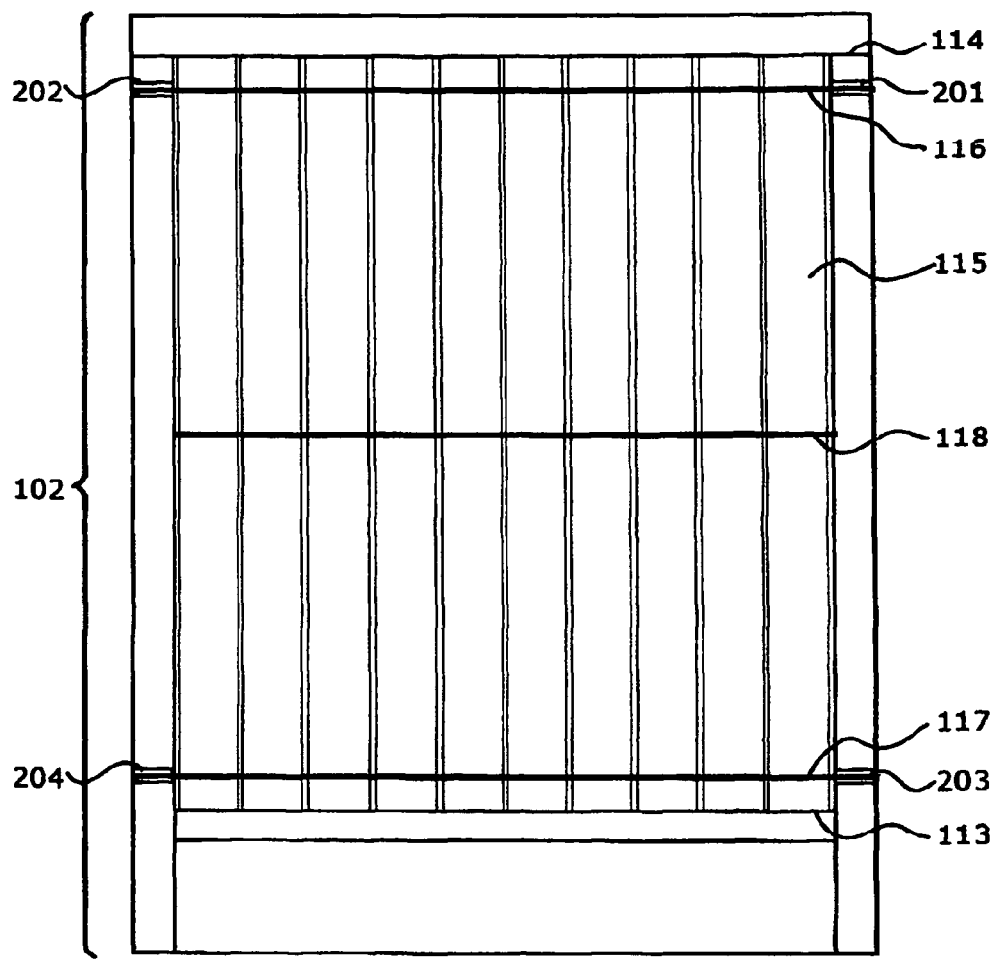

FIG. 2: A top view of a beehive base according to the invention.

Figure 3:
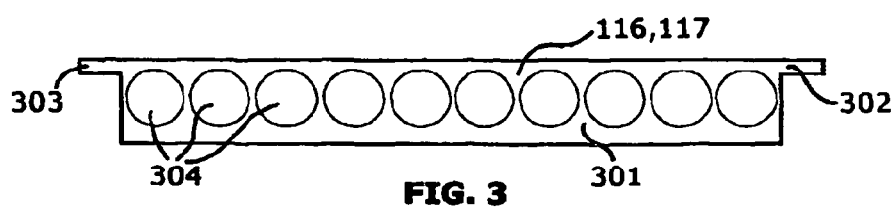

FIG. 3: An illustration of an end crosspiece.

Figure 4:
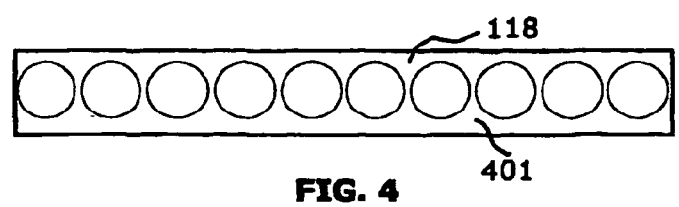

FIG. 4: An illustration of an alignment crosspiece.

FIG. 1 shows a beehive 101 comprising several elements. In practice, these elements are stacked and may be fixed to each other by means known to a person skilled in the art. The lower element is a base 102 of a beehive, also called a base tray. The beehive 101 also comprises, on the base 102, a beehive body 103. The body 103 and base 102 have an identical section at their contact area. The body 103 is covered by a frame cover tray 104, itself covered by a beehive roof 105. In practice between the body 103 and the assembly formed by the tray 104 and the roof 105, the beehive may comprise one or more supers, not represented in FIG. 1.

The body 103 comprises on its upper part, that is, the part close to the tray 104, two slots 106 and 107 for suspending the frames 108. The slot 106 is situated on the front side 109 of the body 103; the slot 107 is situated on the back side 110 of the body 103. The front side 109 is that which is situated on the side where the bee hole 111 is located. The hole 111 is the orifice allowing the bees to enter and exit the beehive 101. The hole 111 is an orifice situated between the body 103 and the base 102. At the hole 111, the base 102 comprises a takeoff platform 112. The upper area of the platform 112 corresponds to the lower area of the hole 111. The back side of the beehive 101 is that which is opposed to the front side.

The upper edge of the frame 108 has a length slightly longer than the spacing which exists between the interior of the front and back sides of the beehive 101, for allowing the frame to be suspended. The frame 108 comprises, suspended from its upper edge, means allowing a honeycomb to be fixed there wherein the length is slightly shorter than the spacing which exists between the interior of the front and back sides of the beehive 101. Thus, when the frame plus honeycomb assembly is introduced into the beehive 101, the ends of the upper edges of the frame 108 push at the slots 106 and 107, ensuring by the same the suspension of the honeycomb in the beehive 101. The honeycomb thus is extended in a direction represented by a straight line perpendicular to the front 109 and back 110 sides of the beehive 101.

The base 102 comprises front 113 and back 114 edges, connected by the lateral edges not represented in FIG. 1. The assembly of these edges forms a framing. Once the beehive is mounted, the edges of the base 102 serve as a support to the sides of the body 103, with the exception of the front side, since it is separated from the base 102 by the bee hole 111.

FIG. 1 shows that the base 102 comprises a bar 115 extending from the front to back of the beehive 101. The bar 115 is maintained by two crosspieces 116 and 117. The crosspiece 116 is situated in proximity to the back of the beehive 101. The crosspiece 117 is situated in proximity to the front of the beehive 101. FIG. 1 also shows an alignment crosspiece 118 whose function is further explained ahead in the description.

FIG. 2 shows the base 102 in top view. The base 102 comprises several bars such as the bar 115. These bars are in circular section and thus extend from the front of the base 102 to the back of the base 102. These bars are regularly spaced. The spacing between the bars varies, according to the construction of the device, between 1 mm and 5 mm. The minimum spacing corresponds to the maximum size of Varroa Jacobsoni. In a first variation, the maximum spacing is that which prevents the bees from passing through this spacing. This is useful, especially when moving the beehives for transhumance. In this case, it is sufficient to plug the bee hole to be sure that no bees escape. In this first variation, the maximum spacing is thus 3.5 mm.

In a second variation, the maximum spacing is determined by ventilation considerations. However, it must be ensured that intruders, for example wasps and hornets, cannot introduce themselves into the beehive 101 by this spacing. In this second variation, the maximum spacing is thus 5 mm.

The lesson of the invention remains valid if the spacing is greater than 5 mm, but other inconveniences then appear, like the possible trespassing of intruders whose presence is harmful to the beehive 101.

FIG. 2 also shows that the lateral edges of the base 102 comprise slots 201 to 204 designed to receive the elements of the crosspieces 116 and 117. The crosspieces 116 to 118 extend in the base 102 according to a direction perpendicular to the direction in which the bars 115 extend. The length of the upper part of the crosspieces 116 and 117 is longer than the existing width between the interior of the lateral edges of the base 102. The length of the lower part of the crosspieces 116 and 117 is substantially equal, that is, slightly shorter, than the existing width between the interior of the lateral edges of the base 102.

FIG. 3 illustrates a crosspiece such as crosspiece 116 or 117. The crosspiece 116 comprises a central part 301 and two protuberances 302 and 303. The protuberances 302 and 303 are situated at the ends of the central part 301, and in line with the largest dimension of this central part 301. These protuberances 302 and 303 are furthermore situated at the upper part of the central part 301.

The central part 301 comprises apertures 304. The form of these apertures corresponds to the section of a bar 115. An aperture 304 thus allows a bar 115 to be introduced, and also ensures its maintenance. That is, once the bar 115 is introduced into the aperture 304, there is no more slack between the bar 115 and the crosspiece 301.

In practice the base 102 comprises as many bars 115 as the beehive 101 comprises frames 108. The crosspiece 301 thus comprises as many apertures 304 as the capacity of the beehive 101, expressed in the number of frames.

The protuberances 303 and 302 fit into the slots 201 and 202 of the lateral edges of the base 102. The crosspiece is thus kept in place. Once the body 103 is in place on the base 102, the crosspiece 116 is integral with the beehive 101. The crosspiece 117 is identical to the crosspiece 116. However, it is introduced into the slots 204 and 203. So, to remove a crosspiece 116 or 117, one must begin by disassembling the base 102 and the body 103.

The crosspiece 118 is identical to the crosspieces 116 and 117 except it does not comprise protuberances on its ends. FIG. 4 shows that the crosspiece 118 only comprises a central part 401 similar to the central part 301 of the crosspieces 116 and 117.

The slots 202 and 201 are situated on the lateral edges opposite from the base 102. The slots 202 and 201 are situated at a first equal distance from the edge 114 of the base 102. The slots 204 and 203 are situated on the lateral edges opposite from the base 102. The slots 204 and 203 are situated at a second equal distance from the edge 113 of the base 102. In practice, these equal distances are on the order of a centimeter. In a preferred variation, the first and second distances are equal.

In practice, the crosspiece 118 is situated equi-distant from the edges 113 and 114 of the base 102.

In an example of construction, it is considered that the internal width of the beehive 101 is 375 millimeters. The internal width is the distance measured between the interior of the lateral sides of the body 103. Furthermore, it is considered that the lateral edges of the base 102 have a thickness of 25 millimeters for a height of 50 millimeters. In this case, the central part 301 of the crosspieces 116 and 117 has a length of 375 millimeters. The height of these crosspieces is 50 millimeters. The protuberances 302 and 303 have a height of 10 millimeters and a length of 25 millimeters. The protuberances bring the total length of the crosspieces 116 and 117 to 425 millimeters.

In our example, the beehive 101 comprises ten frames at a pitch of 37.5 millimeters. In this case, the crosspieces each comprise 10 apertures. The apertures being, in our example, circular, the centers of the apertures are thus spaced from 37.5 millimeters. The centers of the apertures are situated 25 mm from the top of the crosspiece. The radius of the apertures is 17 millimeters, this thus leaves a space of 3.5 millimeters between each aperture.

In the case of a beehive comprising 12 frames, the crosspieces only have to be extended accordingly, so that two apertures can be added.

The function of the crosspieces 116 and 117 is to connect the bars to the beehive. The function of the crosspiece 118 is to mitigate the possible lack of linearity of the bars. The crosspiece 118 thus allows the requirements in the choice of bars to be reduced, and thus allows the selection of inexpensive bars. In particular, in a preferred example, the bars are polyethylene tubes with a thickness of 0.4 millimeters.

The crosspieces 116 to 118 thus ensure the positioning of the bars in relation to the frames 108 and the frames in relation to the others. Once in place, the crosspieces ensure that each bar is positioned under a frame. Thus, when Varroa Jacobsoni falls, it passes directly through the inter-bar spacing and so falls outside the beehive. In practice, the frames 108 are parallel, the bars themselves are thus also parallel.

The material of the bars makes their upkeep greatly facilitated, or even unnecessary. In fact, the material offers only low grip and adhesion to the diverse wastes produced by the beehive.

In a variation of the invention, the section of the bars may be triangular, hexagonal, quadrilateral, or in any convex form not likely to retain the wastes and Varroa Jacobsoni.

In another variation of the invention, a higher number of crosspieces are utilized. In this case, type 116 crosspieces and type 118 crosspieces may be used alternately or the number of type 118 crosspieces may be multiplied.

In another variation of the invention, all the crosspieces, in any number, are type 116 crosspieces.

The invention claimed is:

1. A device forming a base for a beehive comprising a framing having a shape that corresponds to the shape of the beehive, the framing having a hollow interior that includes, under a honeycomb disposed within the beehive and parallel to the honeycomb, at least one bar defining a pair of openings along opposite sides of the at least one bar and wherein the at least one bar is fixed to the framing by at least one crosspiece, wherein the at least one bar comprises several parallel bars, and wherein the spacing between the bars is between 1 and 5 millimeters.

2. The device according to claim 1, characterized in that the at least one bar is fixed to the framing by two crosspieces.

3. The device according to claim 1, characterized in that a lateral edge of the framing comprises at least one slot engageable with the at least one crosspiece for keeping the at least one crosspiece in place.

4. The device according to claim 1, characterized in that the at least one crosspiece comprises at least one aperture corresponding in shape to the shape of the at least one bar.

5. The device according to claim 1, characterized in that the wherein the at least one crosspiece comprises at least one tab that is received in at least one notch formed in the framing.

6. The device according to claim 1, characterized in that each of the bars is circular in cross-section.

7. The device according to claim 1, characterized in that the bars are manufactured of a low-adhesion material.

8. The device according to claim 7 wherein the bars are manufactured of polyethylene.

9. The device according to claim 1, characterized in that the device comprises an alignment crosspiece, spaced from the at least one crosspiece and not fixed to the framing.

10. The device according to claim 1, characterized in that the framing comprises a takeoff platform.

11. The device according to claim 1, characterized in that the device is placed directly under a beehive.

12. A base for a beehive, the base comprising:
 (a) a support structure having a generally open interior;
 (b) a pair of support crosspieces disposed at and connected to opposite ends of the support structure and underlying a honeycomb of the hive received in the interior;
 (c) a plurality of pairs of generally parallel bars which are engaged at each end with the pair of support crosspieces, and which extend across the interior of the structure, and which underlie the honeycomb with each one of the bars being spaced apart between 1 millimeter and 5 millimeters; and
 (d) an alignment crosspiece spaced from the pair of support crosspieces and that is not connected to the support structure.

13. The device according to claim 12 wherein the number of bars are positioned generally perpendicularly to each of the pair of support crosspieces.

14. The device according to claim 12 wherein each of the pair of support crosspieces has a pair of tabs at opposite ends that are positioned within aligned notches disposed on opposite sides of the support structure.

15. The device according to claim 12 wherein the bars are spaced equidistantly from each other and from the support structure.

16. The device according to claim 15 wherein each one of the bars have a round or circular cross sectional shape.

17. A method for controlling parasites within beehives, the method comprising the steps of:
 (a) providing a support structure defining an open interior;
 (b) engaging a number of bars with a first support crosspiece;
 (c) positioning the bars and the first support within the support structure;
 (d) placing the support structure, the bars and the first support crosspiece directly beneath a beehive; and
 wherein positioning the bars and the first support crosspiece within the support structure comprises placing a pair of tabs located at opposite ends of the first support crosspiece within a pair of aligned notches on opposite sides of the support structure.

18. The method of claim 17 further comprising the step of engaging the bars with a second support crosspiece after engaging the bars with the first support crosspiece.

19. The method of claim 18 further comprising the step of engaging the bars with an alignment member after engaging the bars with the first support crosspiece and before engaging the bars with the second support crosspiece.

20. The method of claim 17 wherein the step of engaging the bars with the first support crosspiece comprises inserting one end of each bar into one of a number of apertures on the first support crosspiece.

21. The method of claim 17 wherein the step of positioning the bars comprises positioning the bars so that the spacing between adjacent bars is between 1 millimeter and 5 millimeters.

22. A base for a beehive, the base comprising:
 (a) a support structure having a generally open interior;
 (b) a pair of support crosspieces disposed at and connected to opposite ends of the support structure and underlying a honeycomb of the hive received in the interior;
 (c) a plurality of pairs of generally parallel bars manufactured of a low-adhesion material which are engaged at each end with the pair of support crosspieces, and which extend across the interior of the structure, and which underlie the honeycomb with each one of the bars being spaced apart between 1 millimeter and 5 millimeters; and
 (d) an alignment crosspiece spaced from the pair of support crosspieces and that is not connected to the support structure.

* * * * *